United States Patent [19]

Jaschinski et al.

[11] 4,018,262

[45] Apr. 19, 1977

[54] HEAT EXCHANGE WITH GAS/SOLIDS MIXTURES

[75] Inventors: Klemens Jaschinski; Werner Fuhr, both of Krefeld-Uerdingen; Karl Brandle, Odenthal-Schildgen, all of Germany

[73] Assignee: Bayer Aktiengesellschaft, Leverkusen, Germany

[22] Filed: Feb. 24, 1975

[21] Appl. No.: 552,495

[30] Foreign Application Priority Data

Mar. 6, 1974 Germany .......................... 2410724

[52] U.S. Cl. .................................. 165/1; 34/57 D; 34/57 E; 165/95
[51] Int. Cl.² ......................................... F28F 17/00
[58] Field of Search ................. 165/1, 95; 34/57 D, 34/57 E

[56] References Cited

UNITED STATES PATENTS

| | | | |
|---|---|---|---|
| 2,028,250 | 1/1936 | Rossner | 165/95 |
| 2,287,795 | 6/1942 | Hall | 34/57 D |
| 2,290,470 | 7/1942 | Hall | 34/57 D |
| 2,316,207 | 4/1943 | Winter | 34/57 E |
| 2,792,316 | 5/1957 | Broman | 165/95 |
| 2,809,018 | 10/1957 | Broman | 165/95 |
| 3,020,646 | 2/1962 | Joseph | 34/57 E |

*Primary Examiner*—C. J. Husar
*Assistant Examiner*—Daniel J. O'Connor
*Attorney, Agent, or Firm*—Burgess, Dinklage & Sprung

[57] ABSTRACT

A process for indirect heat-exchange between a solids-containing gas and the inner wall of a heat-exchanger through which the solids-containing gas to be cooled or heated flows, comprising introducing a flushing medium separately from the solids-containing gas into the heat exchanger, the flushing medium being directed angularly at the wall and sweeping about said wall whereby said wall is kept substantially free from solid deposits. Advantageously the heat exchanger is circular in cross-section, the gas/solids mixture is introduced tangentially, and the flushing medium is discharged toward said inner wall through openings in an arm which rotates within the heat exchanger, means being provided to remove gases and solids from the heat exchanger.

5 Claims, 3 Drawing Figures

A-A

HEAT EXCHANGE WITH GAS/SOLIDS MIXTURES

This invention relates to a process for indirect heat exchange between a solids-containing gas and the walls of a heat exchanger, mainly for cooling hot, solids-containing gases, and to an apparatus suitable for carrying out this process.

It is known that hot gases or gas mixtures can be cooled by indirect heat exchange in heat exchangers. However, it is difficult to cool hot gas/solids mixtures containing solids which show a tendency to settle on walls. Numerous processes have the disadvantage that solid particles accumulate on heat-exchange surfaces where they form insulating layers which interfere seriously with heat transfer.

There are various processes for removing solid deposits from walls, for example by knocking the walls continuously or at intervals. It is also known that the walls can be cleaned by means of scrapers or by blasting them with individual jets of liquid or gas containing small quantities of hard solid particles. Measures of this kind are effective to a limited extent only. In some cases, the solid material is contaminated by the solid particles blown in or by abrasion, or the cleaning systems used have only a limited service life.

It is accordingly an object of the invention to provide a process and apparatus for heat exchange with gas/solids mixtures which operates simply without clogging the heat exchanger due to solids build up.

These and other objects and advantages are realized in accordance with the present invention pursuant to which a solids-containing gas to be cooled or heated is introduced into a heat exchanger, and a flushing medium is introduced into the heat exchanger separately from the solids-containing gas, the flushing medium being directed angularly at the wall and sweeping about said wall whereby said wall is kept substantially free from solid deposits.

The invention also relates to an apparatus for indirect heat exchange between a gas-solids mixture and the walls of a cyclone-like, rotationally symmetrical heat exchanger, characterized by the fact that the apparatus includes a rotatably mounted arm (7) which is adapted to the shape of the heat exchanger and which is formed with openings (11) directed on to the heat-exchange surfaces.

By means of this process and apparatus, it is possible to cool hot gases containing solids with a tendency to adhere to walls, without any appreciable reduction in heat exchange compared with solid-free gases, in permanent operation and without any wear affecting the corners of the rotatable cleaning arm.

One example of the application of the process and apparatus according to the invention is the cooling of hot gas/solids mixtures of the kind formed during gas-phase reactions between metal or metalloid halides, for example the chlorides of titanium, silicon, zirconium, iron, zinc, chromium or aluminum, and oxygen-containing gases at temperatures in the range from about 800° to 1500° C. The reaction gases consist essentially of halogens, for example chlorine, and a certain proportion of inert gases, such as nitrogen and/or oxides of carbon and oxygen. By virtue of the process according to the invention, it is possible without any of the difficulties referred to previously, to precipitate the hot gas/solids mixtures although the fine particles, which in some cases are used as pigments, frequently show a marked tendency to adhere and stick immediately after the reaction for reasons which have not yet been fully explained. In connection with hot gas/solids mixtures of this kind, it has repeatedly been proposed to lower temperatures solely by the addition of cold gas. Unfortunately, the effect of adding relatively large quantities of cold gas is that the costs involved in the operation of following gas-cleaning apparatus and also general running costs are correspondingly increased, so that it is best to add cold gas in the smallest possible quantity. By virtue of the fact that the cooling surfaces are regularly flushed in accordance with the invention, the walls remain substantially free from solids. Accordingly, it is possible to obtain high heat-transfer values in permanent operation as well. In addition, the edges of the cleaning arm, which are intended to form a substantially parallel line to the heat-exchange surface, are protected against abrasion. In a preferred embodiment, it is possible by tangentially introducing the gas/solids mixture into the heat exchanger, and by virtue of the rotational flow generated in this way, to obtain high velocities at the exchange surfaces. It is advantageous for rotation of the cleaning arm, rotation of the gas/solids flow and addition of the flushing medium to take place in substantially the same direction. If the flushing gas is added in the direction of rotation (= angle $\alpha$), the walls to be cleaned are largely freed from solids before the outermost edge of the cleaning arm reaches this surface.

The flushing gas is preferably introduced in the form of individual jets, for example through nozzles, bores or slots, in order to minimize the quantity of flushing gas. In this connection, it is advantageous to direct the flushing gas obliquely on to the cooling surfaces because, in this case, the cleaning effect of an individual jet is greater than it is in cases where the jet is directed perpendicularly on to the heat exchange surfaces (= angle $\beta$).

The angles $\alpha$ and $\beta$ are explained in more detail in the following description of FIGS. 1 to 3, wherein.

Figure 1:
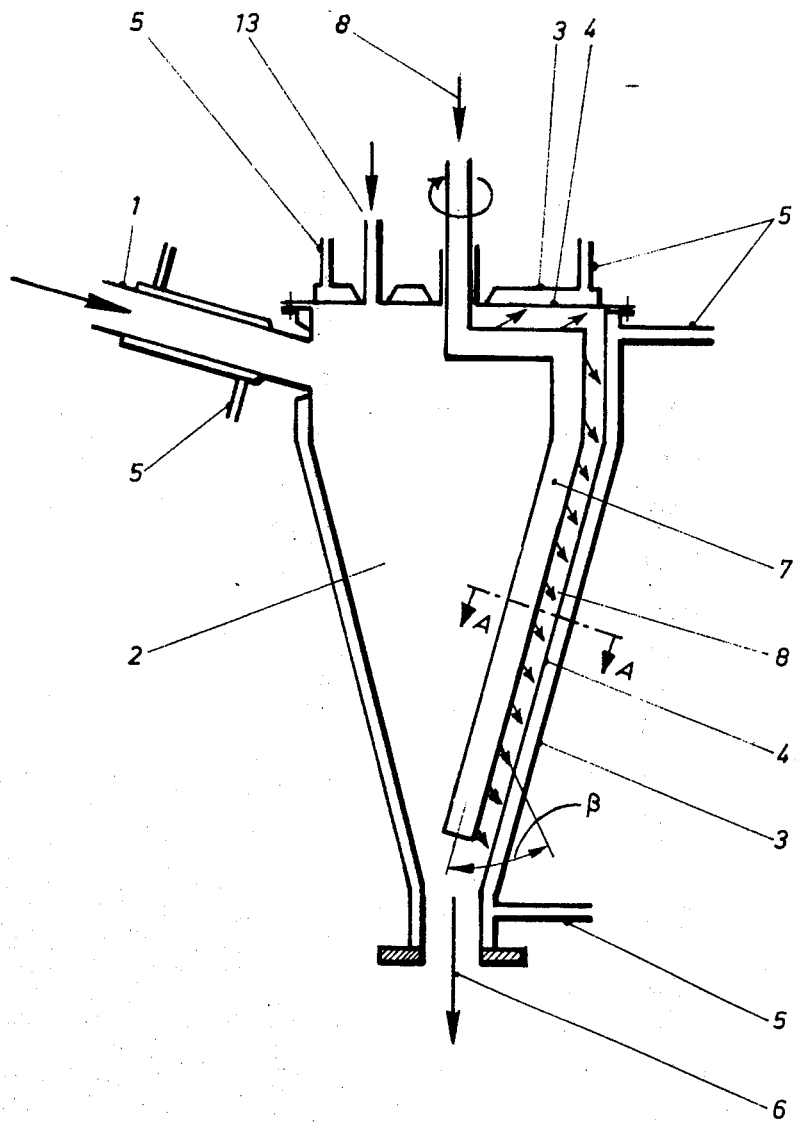
FIG. 1 is a schematic longitudinal section through one embodiment of an apparatus in accordance with the invention.

The reference numerals used in these Figures have the following meaning: 1,5,6,13 and 14 are inlet and outlet pipes, 7 is a cleaning arm, 2 is the interior as a whole, 3 and 4 are walls and 11 is an opening.

Figure 2:
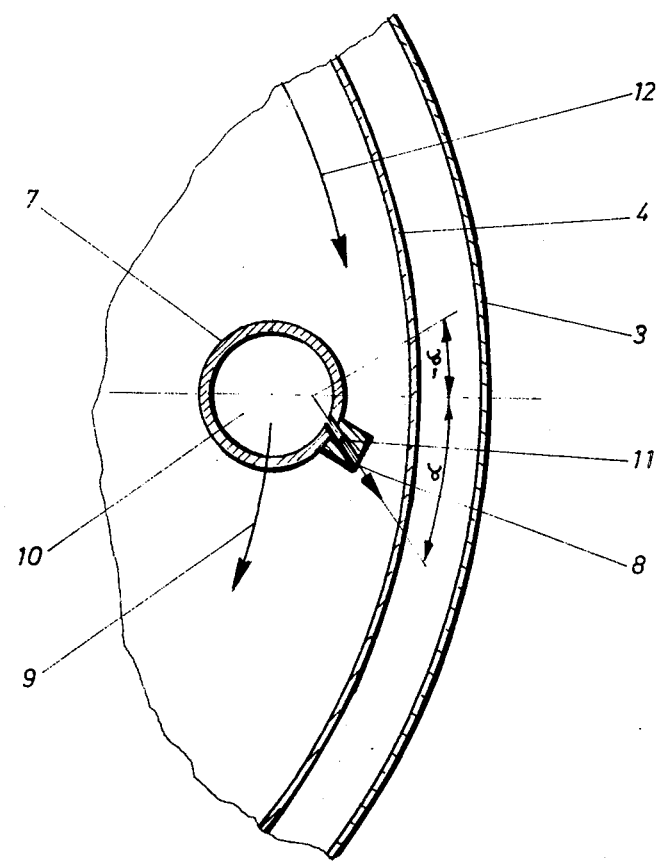
FIG. 2 is a fragmentary section on an enlarged scale taken along line A—A of FIG. 1.

As shown in FIG. 1, a hot, solids-containing gas is introduced into the interior 2 of a heat-exchanger through an inlet pipe which is preferably tangentially arranged. The heat-exchanger is substantially circular in cross-section, i.e. symmetrical about a longitudinal axis in design, and normally consists of metal walls 3 and 4 between which circulates a cooling medium which flows in and out through pipe connections 5. The cooled gas/solids mixture leaves the heat-exchanger through a pipe outlet 6. Flushing gas 8 is blown on to that side of the cooling surfaces 4 facing the hot gas stream through openings in a cleaning arm 7 rotating slowly inside the heat-exchanger and connected to a drive (not shown). One advantageous method of blowing the cooling surfaces is shown in FIG. 2 which is drawn to a larger scale than FIG. 1. The arrow 9 indicates the direction of rotation of the cleaning arm 7.

The cleaning arm 7 is shown as having a tubular cross-section with the inner space 10 for introducing the flushing gas and with openings 11 through which the flushing gas is blown obliquely on to the cooling surfaces 4 to be cleaned. The arrow 12 indicates the direction of rotation of the rotating gas stream when the gas rotates as it flows through the heat-exchanger.

The angle $\alpha$ is the angle between the central axis of the opening 11 for the flushing gas and the connecting line through the axis of rotation of the cleaning arm and through the central axis of the tubular arm (FIG. 2), this connecting line forming an angle of 90° with the central axis of the cleaning arm (FIG. 1). This angle $\alpha$ is an approximate measure of the interval between the point at which the flushing gas contacts the wall and the outer edge of the cleaning arm. If the flushing gas is blown substantially perpendicularly on to the wall, the wall may not have been adequately freed from the solids before reaching the outermost edge of the cleaning arm, with the result that the edge of the cleaning arm is exposed to heavy wear by abrasion.

Although, in cases where the solid deposit is minimal, there is no harm in introducing the flushing gas substantially perpendicularly or in a direction opposite to that in which the cleaning arm is rotating (denoted ($-\alpha$) in FIG. 2), tests have shown that it is of greater advantage in most cases to introduce the flushing gas in the direction of rotation of the cleaning arm. The angle $\alpha$ is preferably between about (+60°) and (−45°), especially about (+15°) to (+60°).

It has also been found that, if the interval between the outlet opening and the wall is too great, the flushing gas has undergone a reduction in flow rate, by spreading, by the time it reaches the wall, with the result that the flushing effect is weakened. Accordingly, the space is generally less than about 15 cm and preferably less than about 5 cm.

In order to reduce the quantity of flushing gas, it may be necessary to introduce the flushing gas in the form of individual jets. In this case, it is advantageous additionally to introduce the flushing gas at an angle $\beta$ (FIG. 1). The angle $\beta$ is the angle at which the longitudinal axis of the cleaning arm, which primarily extends parallel to the heat-exchange surface, intersects the central axis of the individual openings for the flushing gas.

Figure 3:
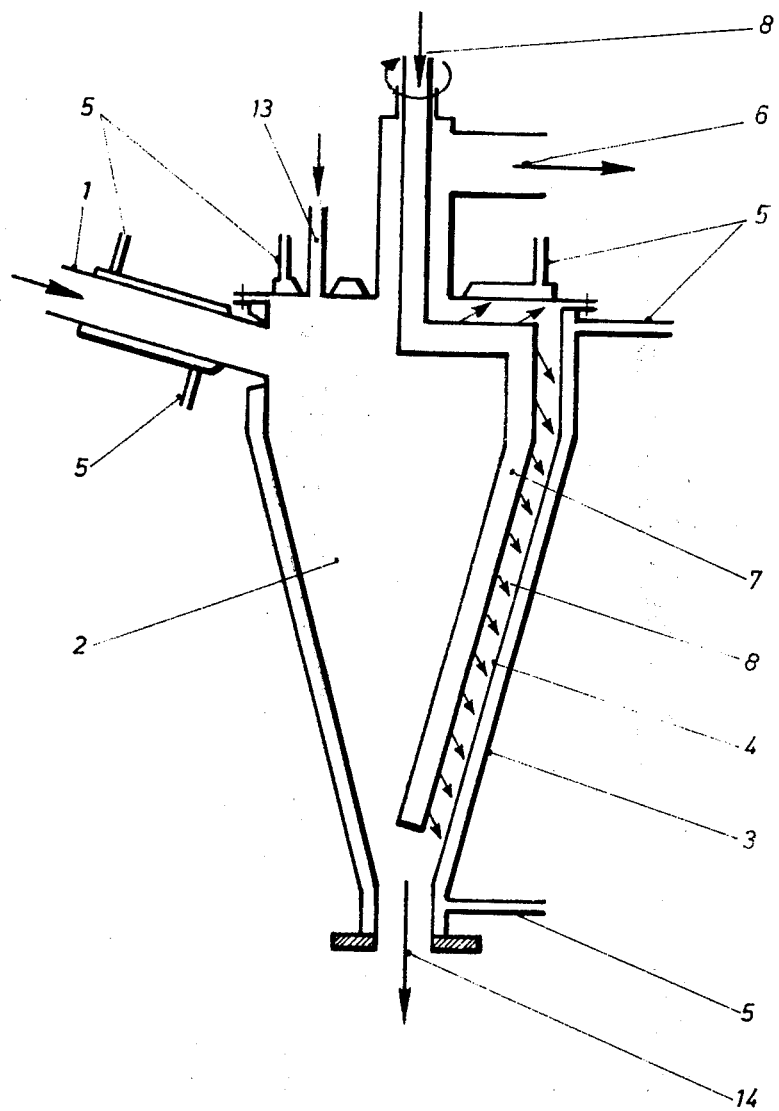
FIG. 3 is a schematic longitudinal section through another embodiment of an apparatus.

FIG. 3 shows another embodiment in which coarse particles of solids which have been separated can be simultaneously discharged through an outlet 14. The fine particles of solids are largely carried back into the gas stream under the effect of intense turbulence along the walls, and leave the heat-exchanger through the upper outlet 6.

In this arrangement, solids may agglomerate under the effect of the intense turbulence. In addition, it is of advantage in some processes to introduce substances, preferably in liquid or gaseous form, into the interior through inlet 13 in order, for example, to enable solids to be aftertreated at elevated temperatures.

It is also possible to increase the separation of solids in following separators by introducing small quantities of water, preferably in vaporous form, to increase the agglomeration of fine particles of solids.

The type of flushing gas introduced through the cleaning arm is governed by the particular process. It is best to select the flushing gas in such a way that it behaves like an inert gas with respect to the solids-containing gas, the solids and the materials in the heat exchanger and following apparatus. In some processes, it is advantageous to use cleaned and cooled recycle gases from the reaction.

The walls of the heat exchanger and the cleaning arm will generally be made of metal.

The cooling of hot gas/solids mixtures by indirect heat exchange with cooled walls is governed by the same principles as the heating of cold gas/solids mixtures by indirect heat-exchange with heated walls. It can clearly be seen that this process is generally suitable for indirect heat-exchange with cooled or heated walls.

The process according to the invention and the apparatus according to the invention can also readily be applied to liquid/solids mixtures, in which case the flushing medium is again introduced through a rotating cleaning arm. In this way, the walls can be kept substantially free from deposits. In addition to gases, liquids can also be used as flushing medium in cases such as these.

In most processes, it is sufficient for the cleaning arm to rotate slowly. A peripheral speed of the cleaning arm of about 0.1 to 20 m/s, preferably 0.5 to 5 m/s is both advantageous and adequate. The quantity and rate of flow of the gas can readily be adapted to the particular process.

The particular advantages of the process and apparatus according to the invention are summarized below:

1. It is possible to obtain high specific heat-transfer values, even in the case of hot gas/solids mixtures whose solid constituents, in other heat exchangers, would give rise to a drastic reduction in heat-transfer on a permanent basis by settling on the cooling surfaces.
2. It is only relatively small quantities of cold gas that are required for cooling in comparison with other conventional processes. As a result, it is possible to reduce equipment costs and running costs in the following apparatus.
3. Cleaning of the heat-exchange surfaces does not involve the introduction of solid particles which could adversely affect the quality of the solids separated.
4. The rotating cleaning arm is subjected to little or no wear by abrasion.
5. Heat exchange is possible even at high temperatures of the gas/solids mixture.
6. The solids can be aftertreated at elevated temperatures.

In addition, separation in any downstream apparatus can be favorably influenced, The invention is illustrated by the following Examples:

EXAMPLE 1

60 l/h of liquid titanium tetrachloride (TiCl$_4$) were evaporated, superheated and introduced into a reactor at a temperature of 450° C. At the same time, a gas mixture of oxygen and nitrogen, heated in an arc to approximately 1800° C, was introduced into the reaction zone of the reactor perpendicularly to the stream to TiCl$_4$. Titanium dioxide (TiO$_2$) and chlorine (Cl$_2$) were formed in accordance with the reaction equation:

$$TiCl_4 + O_2 \rightarrow TiO_2 + 2\ Cl_2$$

By adding inert gases and chlorine and by indirect heat exchange with the cooled walls at the lower end of the reactor and with pipes, the $TiO_2$-containing gas was cooled to 825° C and introduced tangentially into a heat-exchanger of the kind shown in FIGS. 1 and 2. The outer walls of the heat-exchanger were water-cooled. The walls facing the gas consisted of nickel. The cleaning arm was in the form of a nickel tube and was formed with 3 mm diameter bores as its openings. The cleaning arm was not equipped with a water-cooling system, and was only cooled by the gas flowing through it. The distance between the outer edges of the cleaning arm and the metal wall was 20 mm. The peripheral speed of the cleaning arm in the upper cylindrical section amounted to 1.3 m/s. The rate at which the flushing issued from the bores amounted to 51 m/s. Nitrogen was introduced as the flushing gas at a rate of 60 m³/h. The solids content of the hot gas amounted to approximately 90 g of $TiO_2$ per m³ of gas (at a temperature of 825° C).

The heat exchanger had a cooling surface area of 1.5 m². The average residence time of the gas/solids mixture in the heat-exchanger was 0.7 seconds. The heat transfer rate $k$ was found to amount to $$k = 18.4 \ k \ cal/h/m^2 \ °C$$

Thereafter, the heat-exchanger was operated under similar conditions for a total test period of 500 hours without any appreciable change in the heat transfer rate and without any signs of serious wear on the cleaning arm.

The heat transfer rate $k$ was determined in accordance with the following equations which are generally used in the design of heat-exchangers (for example VDI-Warmeatlas, VDI-Verlag Dusseldorf 1963, sheet A4, A5, Cb1):

$$Q = k \cdot F \cdot \Delta t_m$$

where
$Q$ = amount of heat to be dissipated
$k$ = heat transfer rate
$F$ = cooling-surface area
$\Delta t_m$ = mean temperature difference Accordingly, the transfer rate $k$ can be determined in accordance with the following equation:

$$k = \frac{1}{\frac{1}{\alpha_1} + \frac{\delta 1}{\lambda 1} + \frac{\delta 2}{\lambda 2} + \ldots + \frac{\delta n}{\lambda n} + \frac{1}{\alpha_2}}$$

where
$\alpha 1,2$ = heat transfer coefficient on the coolant side or on the side of the medium to be cooled,
$\delta 1,2, \ldots \eta$ = wall thickness of layers between coolant and medium to be cooled,
$\lambda 1,2 \ldots \eta$ = thermal conductivity of layers between coolant and medium to be cooled.

In normal heat exchangers with metal walls, the $\delta/\lambda$ value, unlike the heat transfer coefficients, is only of minimal influence on the heat transfer rates both on account of the high conductivity of metals and on account of the minimal layer thicknesses. Thus, it is sufficient in many cases to aim at high heat-transfer coefficients, for example by selecting maximum flow rates.

However, if layers are formed on the exchange surfaces through the deposition of solids, heat exchange is also determined to a considerable extent by the thickness of the adhering layer on account of the low thermal-conductivity values, especially in the case of non-metallic solids.

EXAMPLE 2 (COMPARISON EXAMPLE)

The same apparatus and the same test conditions as in Example 1 were used for the production of titanium dioxide. The hot $TiO_2$-containing gases were cooled in another symmetrical water-cooled heat-exchanger with a slowly rotating scraper. The heat-exchanger had a heat-exchange surface area of approximately 1.4 m².

The gas was not tangentially introduced. In addition, no flushing gas was introduced through the scraper. The scraper was made of aluminum and was water-cooled.

After a short test period, the heat transfer rate $k$ fell to 2.84 $k$ cal/m²h ° C.

The heat-exchanger was opened after 3 days' testing. The space between the exchange surface and the scraper was completely filled with $TiO_2$. In addition, the outer edges of the water-cooled scraper had been so severely damaged by abrasion that the scraper had to be replaced.

It will be appreciated that the instant specification and examples are set forth by way of illustration and not limitation, and that various modifications and changes may be made without departing from the spirit and scope of the present invention.

What is claimed is:

1. A process for indirect heat-exchange between a solids-containing gas and the inner wall of a heat-exchanger through which the solids-containing gas to be cooled or heated flows, comprising continuously introducing a flushing medium separately from the solids-containing gas into the heat exchanger while the gas is flowing therethrough, the flushing medium being impinged obliquely onto the wall and periodically sweeping about said wall whereby said wall is kept substantially free from solid deposits.

2. A process as claimed in claim 1, wherein the solids-containing gas to be cooled or heated is introduced tangentially into the heat-exchanger.

3. A process as claimed in claim 1, wherein the flushing medium is a gas and it is introduced continuously into the heat exchanger.

4. A process as claimed in claim 1, wherein the solids present in the gas are pigments.

5. A process as claimed in claim 4, wherein the solid is $TiO_2$-pigment.

* * * * *